United States Patent Office 3,639,635
Patented Feb. 1, 1972

3,639,635
PROCESS FOR THE LIQUEFACTION OF MUCUS
James W. Bolger, Canoga Park, Calif., assignor to Riker Laboratories, Inc., Northridge, Calif.
No Drawing. Filed Feb. 11, 1969, Ser. No. 798,463
Int. Cl. A61k *25/00*
U.S. Cl. 424—335
2 Claims

ABSTRACT OF THE DISCLOSURE

A process for the liquefaction of mucus which comprises the contacting of said mucus with 1,4-dimercapto-2,3-O-isopropylidene-2,3-butanediol in an amount sufficient to induce in said mucus a state of liquefaction.

---

This invention relates to a process for liquefying mucus, said process being adaptable for laboratory use and for use in the treatment of animals.

The invention sought to be patented resides in the concept of a process for the liquefaction of mucus which comprises the contacting of said mucus with 1,4-dimercapto-2,3-O-isopropylidene-2,3-butanediol in an amount sufficient to induce in said mucus a state of liquefaction.

The manner and process for making and using the invention will now be generally described so as to enable one skilled in the art to make and use the same as follows:

In carrying out the process according to the present invention, it will be recognized by those skilled in the art that the invention may be practiced both in vivo and in vitro. The in vivo application is employed where it is desirable or necessary as a therapeutic measure to liquefy mucus produced as a result of pathological conditions involving mucus producing tissue, such as, for example, the respiratory system, vaginal tract and the like. The in vitro application is employed where analytical or other examination is made of mucus such as, for example, sputum, nasal mucus, vaginal or cervical mucus, and the like, such examination being facilitated by reducing the consistancy of said mucus to a more liquid state.

In carrying out the process according to the present invention, the mucus to be liquefied is contacted with 1,4-dimercapto - 2,3 - O - isopropylidene-2,3-butanediol which may be present in the form of any of its several stereoisomers or mixtures thereof, all of which are equivalents for the purpose of this invention.

In in vivo applications the 1,4-dimercapto-2,3-O-isopropylidene-2,3-butanediol, which is a liquid, is conveniently used in the form of a dilute solution in an inert vehicle such as, for example, an aqueous solution or a fluorinated or chlorofluorinated hydrocarbon solution, such dilute solutions being particularly adapted for application by spraying with an atomizer, nebulizer, self-propelling pressurized aerosol, and the like.

Where a pressurized composition is used the pressurized vehicle for the active mucolytic ingredient comprises a liquefied propellant, preferably a fluorinated or chlorofluorinated hydrocarbon or mixture thereof, having a vapor pressure of at least 13 pounds per square inch gauge at 70° F.

The concentration in vitro, at which 1,4-dimercapto-2,3-O-isoproplyidene-2,3-butanediol has been found to effectively induce the liquefaction of mucus is between about 0.005 and 0.5 molar. The agent, which is a liquid, is prepared in the form of an aqueous solution at the desired concentration and then mixed with the mucus at a ratio of about 0.2 ml. of the aqueous solution of mucolytic agent to each 1.0 ml. of the mucus. Depending upon the concentration used, a high degree of liquefaction will be achieved within from about 1.5 to about 10 minutes.

Where the 1,4-dimercapto-2,3-O-isopropylidene-2,3-butanediol is to be used in vivo, and particularly where it is to be used in the form of a self-propelling pressurized composition, the composition will generally contain about 0.1 to 10 percent by weight of the active ingredient. The actual formulation may be effected by any of the techniques commonly used in the art of preparing pressurized self-propelling compositions. The composition is administered to the animal in an amount sufficient to induce in the mucus of said animal a state of liquefaction. It will be readily apparent that the correct dosage to be employed with any particular subject will be determined by the individual administering the drug based upon the severity of the condition requiring mucolytic therapy, as well as the age, sex, weight, and general physical condition of the subject. The exact amount to be administered should be non-toxic, yet sufficient to induce liquefaction of the mucus. When the composition of the invention is packaged in a pressurized container fitted with a metered dose aerosol valve, the individual administering the drug can readily control the quantity by the proper selection of the number of valve actuations per dose. In addition, in the process of manufacture, the concentration of the active agent in the composition can be varied over wide limits.

The best mode contemplated by the inventor for carrying out this invention will now be set forth as follows:

The 1,4-dimercapto-2,3-O-isopropylidene-2,3-butanediol which is used in the practice of this invention is a known compound that is readily prepared as described by M. Carmack and C. J. Kelley, J. Org. Chem. 33(5): 2171–2172 (1968).

EXAMPLE

Acute toxicity determinations, in accordance with standard pharmacological test procedures, reveal that L-1,4-dimercapto-2,3-O-isopropylidene-2,3-butanediol has an $LD_{50}$ of 680 mg./kg. and DL-1,4-dimercapto-2,3-O-isopropylidene-2,3-butanediol has an $LD_{50}$ of 400 mg./kg. in the mouse when administered intraperitoneally.

The mucolytic activity of both L- and DL-1,4-dimercapto-2,3-O-isopropylidene-2,3-butanediol was determined using the method described by J. Lieberman, Amer. Rev. of Resp. Dis. 97(4): 654–661 and 662–72 (1968). According to this method the viscosity of purulent sputum obtained from children with cystic fibrosis and patients with emphysema is evaluated in a cone-plate viscometer. The mucolytic activity of the test compound is evaluated at several timed intervals, after contacting the purulent sputum with varying concentrations of the test compound. Aqueous solutions of the test compound are prepared in concentrations of 0.005, 0.05 and 0.5 molar. In the test the viscosity of the purulent sputum is obtained and then the test agent is mixed with the sputum in the viscometer (0.2 ml. of test agent in water with 1.0 ml. of sputum) and the viscosity again determined. The results of the test are as follows:

PERCENTAGE OF INITIAL VISCOSITY

| Time in seconds | Saline control | Test compound: 1,4-dimercapto-2,3-O-isopropylidene-2,3-butanediol | | | | | |
|---|---|---|---|---|---|---|---|
| | | L-form molar conc. | | | DL-form molar conc. | | |
| | | 0.005 | 0.05 | 0.5 | 0.005 | 0.05 | 0.5 |
| 37.5 | 96 | | 60 | 44 | | 66 | 52 |
| 75.0 | 96 | 70 | 21 | 13 | 87 | 30 | 25 |
| 150.0 | 96 | 41 | 11 | 9 | 56 | 13 | 18 |
| 300.0 | 96 | 15 | | | 17 | 9 | |
| 450.0 | 96 | 11 | | | 13 | | |
| 600.0 | 96 | 9 | | | 10 | | |

These results show both L- and DL-1,4-dimercapto-2,3-O-isopropylidene-2,3-butanediol to be particularly effective in vitro in the liquefaction of purulent mucus at molar concentrations of between about 0.5 (100 mg./ml.) and 0.005 (1 mg./ml.).

The subject matter which the applicant regards as his invention is particularly pointed out and distinctly claimed as follows:

I claim:

1. A process for the liquefaction of mucus, which comprises contacting said mucus with an amount of 1,4-dimercapto-2,3-O-isopropylidene-2,3-butanediol sufficient to liquefy said mucus.

2. The process according to claim 1 wherein said 1,4-dimercapto-2,3-O-isopropylidene-2,3-butanediol is L-1,4-dimercapto-2,3-O-isopropylidene-2,3-butanediol.

References Cited

UNITED STATES PATENTS 3,502,779   3/1970   Dye et al. _____ 424—335

OTHER REFERENCES

Carmack, M. et al., "J. Org. Chem.," vol. 33, 5 (1968), pp. 2171–2172.

JEROME D. GOLDBERG, Primary Examiner

V. D. TURNER, Assistant Examiner